Feb. 27, 1923. 1,446,628

W. F. RIDGE

COVER FOR STEERING WHEELS

Filed Aug. 12, 1922

Inventor
William F. Ridge

By A. L. E.

Attorney

Patented Feb. 27, 1923.

1,446,628

UNITED STATES PATENT OFFICE.

WILLIAM F. RIDGE, OF AKRON, OHIO.

COVER FOR STEERING WHEELS.

Application filed August 12, 1922. Serial No. 581,326.

*To all whom it may concern:*

Be it known that I, WILLIAM F. RIDGE, a citizen of the United States, and a resident of Akron, county of Summit, State of Ohio, have invented certain new and useful Improvements in Covers for Steering Wheels, of which the following is a specification.

This invention has for its object the provision of an elastic cover or sheath, which, while it is capable of further and more extended use, is particularly suitable as a cover for the steering wheels of automobiles. The cover is one which can be easily slipped over the steering wheel and will stay in place by contraction upon the wheel, there being no securing element necessary to hold it in place. The cover also is designed to improve the grip which the driver may obtain upon the steering wheel.

Other advantages may be obtained by the use of the invention, the principal object of which is to provide a sightly, easily applied cover or grip increasing device which may be used without the provision of lacing or clips to hold it in place on the steering wheel.

Figure 1:
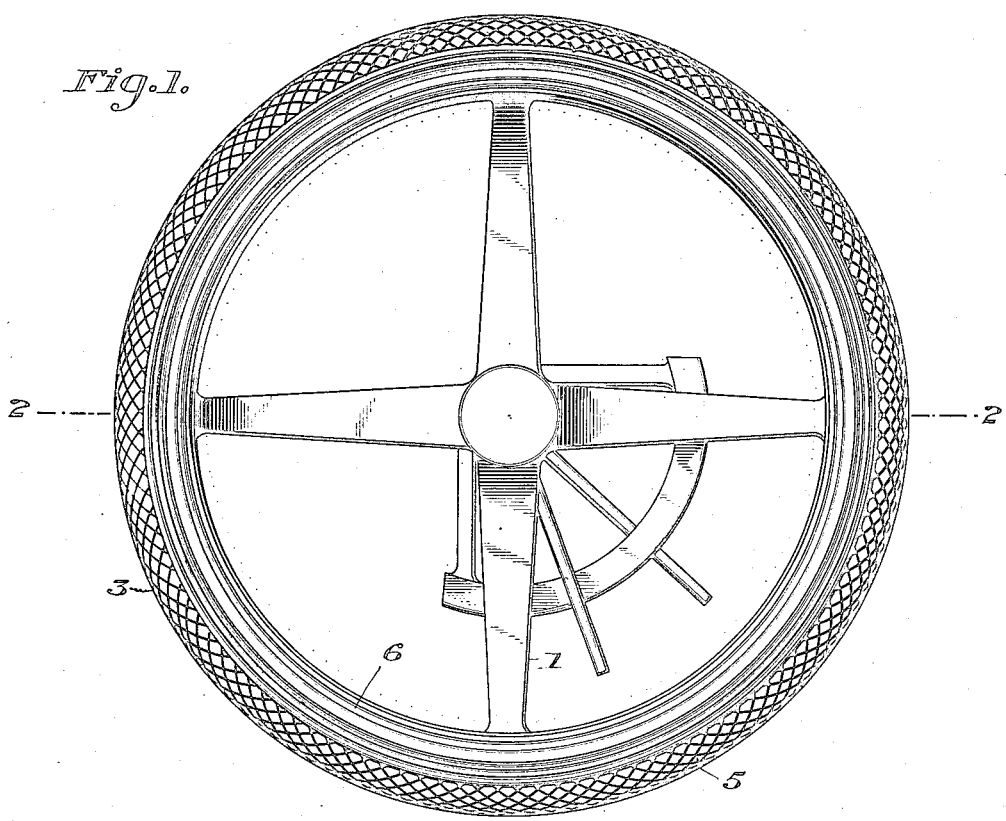
Figure 1 is a plan view of a steering wheel with the cover in place thereon.
Figure 2:
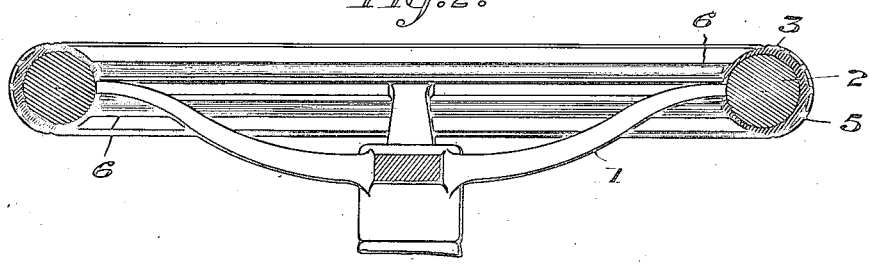
Figure 2 is a section on the line 2—2 of Figure 1.
Figure 3:
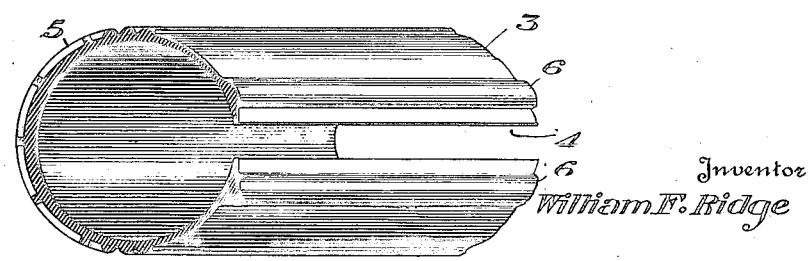
Figure 3 is a fragmentary section of the cover.

In the drawings the steering wheel of the automobile is indicated by the numeral 1, the rim or periphery of the wheel being indicated by 2. The cover is indicated by the numeral 3 and is formed as a hollow torus or ring having a continuous slit 4 on its inner periphery. The cover is composed of rubber or rubber-like composition which is stretchable throughout and is so constructed that it normally is smaller in circumference than the circumference of the wheel to which it is to be applied. The cover may be slightly thickened on its outer periphery and is preferably provided with a roughened outer surface 5 to provide a non-slipping surface for aiding the driver to grasp the wheel securely.

Parallel to the edges of the slit 4 the cover may be provided with thickened beads 6 which, upon the contraction of the cover over the wheel, will assist in drawing the edges of the cover around the inner surface of the rim 2.

It will be observed that when the cover is stretched over the rim of the steering wheel that it is maintained in place by the contraction of the cover and no further fastening means is needed. The cover protects the steering wheel and assists the grip of the driver thereon.

It is obvious that the invention is not limited to exact conformance with the details shown, but may be varied or changed within the scope of the appended claims without departing from the essential features of the invention.

What I claim is:

1. In a device of the character described, a steering wheel, in combination with a continuous elastc cover therefor, normally less in circumference than the circumference of the steering wheel and conforming by the elasticity of the cover to the circumferential and transverse curvature of the wheel throughout the extent of the cover.

2. As a new article of manufacture, a cover for steering wheels, comprising an elastic torus having a slit in its inner circumference, said cover being so designed and constructed that it will shape itself throughout its entire extent to the circumferential and transverse curvature of the wheel solely by its inherent contractile properties.

3. As a new article of manufacture, a cover for steering wheels composed of elastic material, said cover being in the form of a torus which is substantially circular in cross section and provided with a slit about its inner circumference, and two thickened bead like formations on the sides of the slit, said torus being smaller in circumference than the circumference of the steering wheel, whereby it clings to the wheel by contraction over the entire extent of the cover.

WILLIAM F. RIDGE.